Sept. 26, 1961     M. SHANE     3,001,614
REINFORCED WELDED PANEL ASSEMBLY
Filed Aug. 15, 1958     2 Sheets—Sheet 1
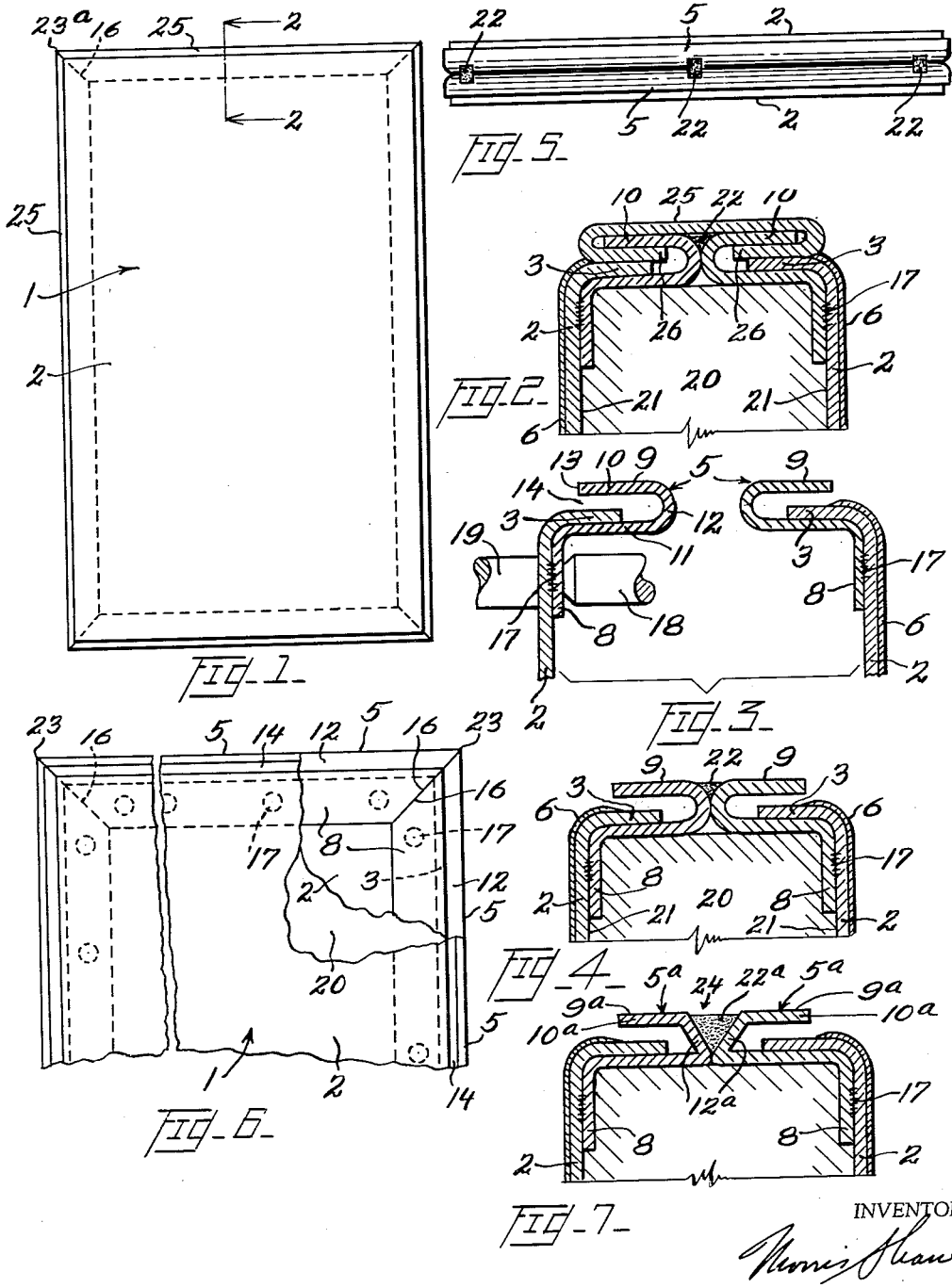
INVENTOR

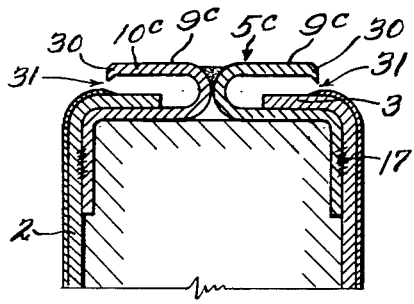
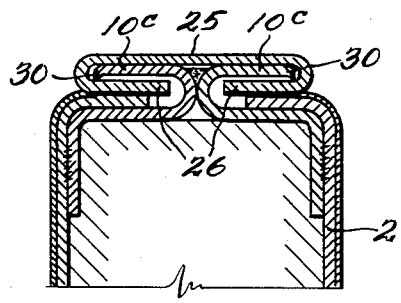
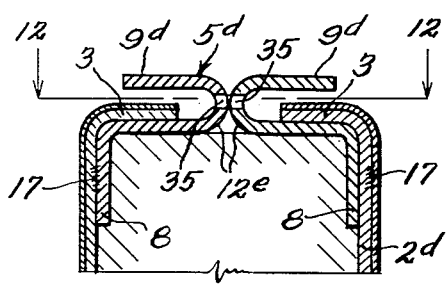
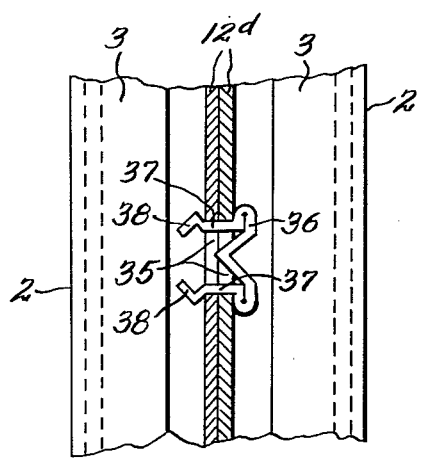
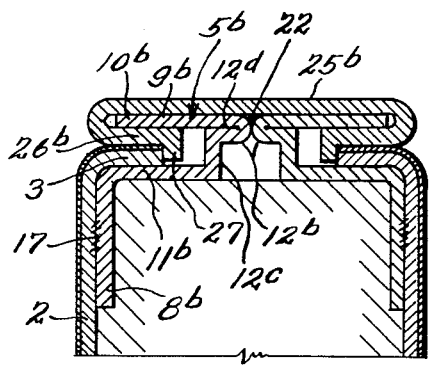

United States Patent Office

3,001,614
Patented Sept. 26, 1961

3,001,614
REINFORCED WELDED PANEL ASSEMBLY
Morris Shane, Westbury, N.Y., assignor to Flush-Metal Partition Corp., Long Island City, N.Y.
Filed Aug. 15, 1958, Ser. No. 755,306
4 Claims. (Cl. 189—34)

This invention relates to metal panel partition structural assemblies and particularly to a panel unit having a novel reinforcing welded joint fabrication and assembly adaptable for use either with thin gauge sheet metal panel sides of stainless steel or other thin gauge sheet metal, or with sheet metal panel sides which are to be vitreous or porcelain coated prior to the complete assembly of the panel unit.

In the conventional form of panel construction embodying pan shaped sheet metal sides having peripheral flanges arranged in opposed relation, the pans are joined together along the sides thereof by unitary edging strips which are normally spot welded thereto to constitute an integral panel unit. In the conventional panel construction aforesaid, the customary electric spot welding of the pans to the unitary edging strips by the normal high pressure application of the electrode to the exterior surface of the pans results in the formation of indentations therein that requires a necessary grinding and smoothing operation as well as the use of a filler that is both costly and time consuming; all this preliminary to applying the finish coating thereto. After complete assembly of such a panel construction the prepared exposed surfaces thereof are then provided with a finished coating of paint or enamel in the manner well known in the art.

In panel units having stainless steel sides, which generally are of thin gauge, and fabricated in the conventional manner aforesaid, the usual spot welding is not satisfactory due to the high pressures required in the application of the electrodes to the outer surface of the stainless steel panel sides and to the lack of sufficient backing provided by the unitary edging strips to rigidly support such high pressures.

Further, where it is desired to form a vitreous or porcelain coated panel, this conventional manner of panel fabrication and finishing is not feasible for the reason that if a sheet metal panel unit is initially assembled in the conventional manner aforesaid, the process of applying a vitreous or porcelain coating to such a completed panel would damage or destroy the cardboard filler body usually provided within the panel unit due to the exceedingly high temperatures necessary to make a glaze or porcelain coating.

Accordingly it is one object of this invention to form a panel unit made up of opposed flanged pans of relatively thin gauge stainless steel or other sheet metal by first providing the flanges of each pan of the panel unit with a flanged edging clip made of a heavier gauge extending the full length of each flange, each edging clip having a reinforcing flange adapted to abut the inside surface of the pan adjacent its flange and permanently secured thereto by spot welding from the inside of the pan to provide a reinforcing border along the edge portions of the pan and to provide an exterior pan surface free of markings and indentations.

Another object of this invention relates to providing a sheet metal flanged pan and its secured edging clip with a vitreous or porcelain coating applied to the exterior surface of the pan prior to its assembly into a panel unit.

A still further object of this invention relates to the securing, by welding or fastening elements, of the flanged edging clips together when the pans having the same already affixed thereto are positioned with the edging clips in opposed contacting relation, with a filler provided between the pans, so as to permanently and/or detachably secure the pans in assembled relation to form the panel unit.

An additional object of this invention relates to the provision of a sheet metal edging strip which is superposed over the joined flanged edging clips of opposed pan flanges whereby to provide a finished edge for the panel unit.

Another object of this invention relates to the initial joining of the opposed pans together by the provision of a filler body disposed between the pans and adhesively secured to the inside surfaces of said pans so that the panel upon the completion of this stage of its manufacture may be handled as a unit preliminary to the securing of the edging clips together.

It is also a further object of this invention to provide each of the flanges of each pan with an edging clip formed as an integral part of the pan flange.

Another object of this invention is to provide an improved method for forming and assembling a thin gauge stainless steel or other sheet metal panel unit, or a vitreous or porcelain coated panel unit which method of assembly is the same in each instance and which can be carried out quickly, efficiently and expeditiously on a mass production basis in a novel manner not heretofore employed.

Other objects of this invention will become apparent as the disclosure proceeds.

Various other features and advantages of the invention will be apparent from the following particular description and from an inspection of the accompanying drawings.

With these and other objects in view, which may be incident to the improvements disclosed, the invention consists in the parts and combinations as hereinafter set forth and claimed, with the understanding that the several necessary elements comprising the invention may be varied in construction, proportion and arrangement without departing from the spirit and scope of the appended claims.

Referring to the following description taken in connection with the accompanying drawings forming a part thereof:

FIG. 1 is a side elevational view of the panel unit;

FIG. 2 is a sectional view on line 2—2 of FIG. 1 showing the details of construction of the edging clips, their assembly with the pan flanges and the mounting of the edging strip;

FIG. 3 is a detail sectional view showing the individual pan flanges with attached edging clips separated and the manner of spot welding an edging clip to its associated pan;

FIG. 4 is a detail sectional view similar to that of FIG. 2 showing the pans brought together with the edging clips in contacting relationship and the weld joining the same, the edging strip not being applied;

FIG. 5 is a plan view of one side edge of the panel unit with the edging strip omitted showing the spaced welding of the edge clips to each other;

FIG. 6 is a partial side elevational view of the panel unit with one corner broken away to show details of construction;

FIG. 7 is a detail sectional view similar to that of FIG. 4 showing a modified form of edge clip construction;

FIG. 8 is a detail sectional view similar to that of FIG. 2 showing a modified form of edge clip and edge strip construction;

FIG. 9 is a detail sectional view similar to that of FIG. 4 showing a still further modified form of edge clip construction;

FIG. 10 is a detail sectional view of the edge clip construction of FIG. 8 with an edging strip applied thereto;

FIG. 11 is a detail sectional view similar to that of FIG. 4 showing a still further modified form of edge clip construction; and FIG. 12 is a detail sectional view taken on line 12—12, FIG. 11, showing one example of a fastening element for joining the edge clips of FIG. 11 together.

Similar reference characters refer to similar parts through out the several views of the drawings and specification.

Referring to the drawings, my improved panel unit 1, shown in side elevation in FIG. 1, is formed from a pair of like sheet metal pans 2—2, each provided with a continuous flange 3 at each side thereof, the flanges 3 being of uniform width throughout and disposed normal to the plane of the pan body.

The edge clips 5 as most clearly shown in FIG. 3 are utilized in pairs, as the pans 2 in their assembly to form the panel unit 1 are arranged with their corresponding flanges 3 in opposed relation. Each edge clip 5 is formed from sheet metal preferably of a heavier gauge than the sheet metal of the pans 2 bent into bar stock, and consists of a right angularly related flange 8 and channel 9, the latter being defined by an outer channel wall 10 and an inner channel wall 11, joined by a channel bottom 12; the channel walls 10 and 11 being preferably parallel and with the outer edge 13 of the outer channel wall 10 terminating short of the plane of the flange 8 to define the channel opening 14. The space between the channel walls 10—11 is uniform throughout and is slightly greater than the thickness of the pan flange 3 for a purpose to be hereinafter described.

Depending on the length and width of the pans 2, the edging clips 5 are made of a length corresponding to the length of the pan flanges 3 and are mitered at their ends as at 16. Thus, viewing FIG. 6, wherein is shown a portion of a panel unit 1 with a corner portion of one pan 2 cut-away, it will be seen that the edging clips 5 with their mitered ends abutting are disposed along the pan flanges 3 somewhat in the manner of a frame. Each edging clip 5 is secured to the pan body 2 by placing the flange 8 in engagement with the inside surface of the pan body, see FIG. 3, such that the pan flange 3 will extend into the channel 9 and seat against the inner channel wall 11. In this position, the edging clip 5 is electrically spot welded at spaced intervals as at 17 with the pressure or hot electrode 18, see pan 2 at the left of FIG. 3, directly contacting the edging clip flange 8 and the backing electrode 19 bearing against the exterior surface of the pan 2. This manner of spot welding the edging clips 5 to the pan 2 from the inside of the pans will preclude the marring by indentations or otherwise of the exterior surface of the pans which thereby retains its original smooth finished surface. At this stage each pan with its affixed edging clips is provided on its exterior surface with a vitreous or porcelain coating 6 as shown by the pan 2 at the right of FIG. 3. Prior to the baking operation, the coating material is wiped off from the surfaces of the edging clips 5.

with the edging clips 5 thus permanently secured to a pair of like pans 2, one pan 2 is placed on a horizontal flat surface with the edging clips 5 uppermost, and a filler body 20 of any desired material is placed therein and adhesively secured to the interior surface of the pan in any suitable manner. In a like manner, the other pan 2 is placed over the filler body 20 with the upper surface thereof similarly adhesively secured to the interior surface of the upper pan. The two pans with the bottoms 12 of the channel portions of the edging clips 5 in abutting relation, see FIG. 4, are preferably clamped together (not shown) until such time as required for complete setting of the adhesive bond 21 between the filler body 20 and the pans, whereby upon removal of the clamping means (not shown) the panel unit may safely be handled. At this stage of assembly, the opposed edging clips 5 are then welded together along each of the sides of the panel unit by spaced welds 22, see FIG. 5, thus permanently uniting the two pans 2 into an integral panel unit. As will be seen in FIGS. 4 and 5, the welding of the edging clips 5 together takes place at spaced points within an elongated recess defined by the juncture of the channel bottoms 12. Should any weld 22 project beyond the plane of the outer surface of the channel walls 10 of the edging clips 5, the same is made flush by grinding down. Where the mitered ends of the edging clips 5 abut each other the same may also be welded together as at 23 to effect greater rigidity and strength in the panel unit.

In some instances, see FIG. 7, particularly for large and heavy panel units, the channel bottoms 12a of the edging clips 5a may be shaped somewhat flat and inclined to present when in abutting relation a V-shaped gap 24 so that a greater weld 22a may be utilized without danger of the weld 22a projecting beyond the outer surfaces of the outer channel walls 10a of the channels 9a.

To conceal the edging clips 5 and the welds 22 joining the same, there is provided an edging strip 25, formed of sheet metal having inwardly bent and opposed marginal flanges 26 of equal size and spaced from the body of the edging strip a distance substantially equal to the thickness of the outer channel wall 10 of the edging strip so as to snugly receive the same by a sliding friction fit as the edging strip is slid thereover in the manner readily apparent. The thickness of the edging strip 25 is such that the flanges 26 thereof will also be snugly received by a sliding friction fit between the pan flanges 3 and the inner surface of the channel walls 10, all as clearly shown in FIG. 2. The edging strip 25 may be made of stainless steel, chrome or nickel plated steel or may even be porcelain coated so as to provide a pleasing and distinctive edge for the panel unit. If desired the abutting ends of the edging strips 25 at the corners of the panel unit may be welded together as at 23a.

It will be understood from the construction of the panel unit as hereinbefore described, that the flange 8 of the edging clips 5 which is disposed peripherally around the entire edge portion of each of the pans 2, provides a reinforcing border effecting a rigidity and strength needed for the attachment of hardware to the edge portions of the panel unit such as brackets, hinges, catches, locks, etc. (not shown). Where the location of the hardware to be applied to a panel unit is known in advance; accordingly when the vitreous or porcelain coating is first applied to the pans 2, the same at such locations is wiped off prior to the baking of the vitreous or porcelain coating on the pan so as to facilitate the drilling of holes at said spots for the attachment of said hardware.

In FIG. 8 there is shown a modified form of edging clip and edging strip construction for heavy gauge sheet metal pans employed in large and heavy panel units. The edging clip 5b, in this form, is provided with a flange 8b corresponding to the flange 8 of the edging clip 5, and the channel 9b has its bottom 12b offset as at 12c whereby to bring the channel walls 10b and 11b adjacent said bottom into contacting engagement as at 12d. This provides for a channel of increased strength due to the larger channel width and length required for the heavy gauge sheet metal pans and where the thickness of the panel unit is relatively great as compared to that of FIG. 2. The terminal ends of the marginal flanges 26b of the edging strip 25b are each deflected outwardly from the same as at 27 to define flanged guides which are adapted to engage the edges of the pan flanges 3 when the edging strip 25b is slid over the edging clips in interfitting engagement therewith. The flanged guides 27 function to accurately center the edging strip 25b on the edge of the panel unit. The assembly of the panel unit of FIG. 8 is otherwise the same as that of FIG. 2.

FIGS. 9 and 10 illustrate a further modification of edging clip construction. In this form, in order to insure a more positive friction tight grip of the edging clip on the edging strip than that obtained by the channel walls 10 on the edging strip flange 26, in the construction of FIG. 2, the terminal ends of the channel walls 10c of the edging clips 5c are deflected slightly downwardly as at 30 whereby the gap 31 at the openings of the channels 9c are made slightly less than the thickness of the edging strip flanges 26. Thus, when the edging strip 25 which is identical with that employed in FIG. 2 is slid over the edging clip channel walls 10c, the terminal ends 30 of the channel walls 10c will tightly grip the edging clip flanges 26 at their outermost ends, see FIG. 10, or along a line adjacent the juncture of the flanges 26 with the body of the edging clip 25. It is to be understood that this form of edging clip construction embodying deflected ends may be utilized with any one of the edging clip constructions illustrated and described herein.

In the several modifications hereinabove described, in each form of panel unit construction, the edging clips 5 are welded together, as at 22, to effect a permanently secured panel unit. However, this invention also contemplates a detachable or separable connection of the edging clips 5, whereby in view of the fact that the panel pans 2 are vitreous or porcelain coated, should one of the pans become damaged, the same may be readily separated from its other pan and be replaced. With such a construction it may or may not be desired to adhesively secure the filler body 20 to the inside surfaces of the pans 2. Other reasons such as, for example, providing the panel unit in knock-down form may also compel the desirability of having the pans 2 separable by providing a detachable connection between the edging clips 5. Thus, in FIG. 12 there is shown an example of a detachable connection for the edging clips 5, this view being taken on line 12—12 of FIG. 11 which figure corresponds to that of FIG. 4. In FIG. 11, each of the edging clips 5d is provided in the bottom 12e of the channel 9d with a row of suitably spaced openings 35, such that, when the edging clips 5d on opposed pans 2d are brought together in abutting relation, the openings 35 will be in registry for the reception of a fastening element (not shown). FIG. 12 shows one example of a fastening element that may be employed. In FIG. 12, a U-shaped spring clip 36 is shown forced into the registering openings 35, the arms 37 of the spring clip having their ends 38 bent outwardly to grip the wall of the channel bottom. The form of fastening elements 36 is exemplary only, it being understood that any suitable type of fastening means for metallic members may be employed such as screws, staples, etc.

While the panel unit construction hereinabove described relates to the exterior surfaces of the pans forming the sides thereof being vitreous or porcelain coated, it is pointed out that the pans as set forth in the objects of the invention can be of thin gauge stainless steel or other thin gauge metal. In each instance the above described manner of spot welding the edging clips to the pans from the inside of the pans is identical so that the outside surface of the pans will be free of markings and/or indentations. The use of a heavier gauge edging clip will insure a reinforcing border along the pan edge portions of great strength and rigidity and the welding or fastening of the edging clips together is the sole means for holding the pans secured to each other to effect a rigid panel unit. It is to be understood that the edging strip covering the edging clips is merely ornamental to provide a finished edge for the panel unit, and is not relied on to hold the pans together. It is to be also understood that each of the modified edging clip constructions as illustrated and described may be used with pans formed of stainless steel or other sheet metal.

I claim:

1. A panel unit comprising a pair of opposed pans, an edging clip member permanently secured to a corresponding edge portion of each pan and constituting in part a reinforcing border therefor, said edging clip members being disposed in opposed abutting relation, means securing said edging clip members together and lying on the side thereof opposite said reinforcing border parts to maintain the opposed pans in fixed assembled relation, an edging strip superposed over said edging clip members in interfitting relation therewith and concealing said securing means, each said edging clip member being of a length corresponding to the length of the edge of the pan, the edge portion of each pan including a flange, one part of said edging clip member defining said reinforcing border and another part of said edging clip member being normal to the plane of said first part and defining an elongated channel receiving an adjacent pan flange, the bottoms of said channels in their abutting relation defining an elongated recess, said means for securing said edging clip members together being constituted by spaced welds in said recess, said edging strip being formed with inwardly directed marginal portions each frictionally interfitting between an adjacent pan flange and the outer channel wall of the channel of an edging clip member, a filler body disposed interiorly of said opposed pans adhesively secured to the interior surfaces thereof, said pans being formed of sheet metal of relatively thin gauge and said edging clip members being formed of relatively heavier gauge metal, the permanent securing of said edging clip members to said pans being effected by spot welding the reinforcing border part thereof directly to the pans from the inside of said pans whereby the exterior surface of said pans will be free of markings and/or indentations.

2. A panel unit comprising a pair of opposed pans each having a vitreous or porcelain coating on the exterior surface thereof, a flange formed on each pan along each side edge thereof with the flanges of both pans in coplanar opposed relation, an edging clip for each flange having one part permanently secured to the inside surface of each pan and another part of elongated channel formation normal to the plane of said first mentioned part receiving the associated pan flange in contacting relation with the inner channel wall, said first mentioned part of the edging clip constituting an interior reinforcing border along the edge portion of each pan, said channels of opposed edging clips having their bottoms abutting and together defining a longitudinal recess, the outer walls of opposed channels being coplanar, means joining said opposed edging clips together at said channel bottoms and lying on the side thereof opposite said reinforcing border parts to maintain the opposed pans in fixed assembled relation, a filler body within the opposed pans adhesively secured thereto, a unitary edging strip superposed over said joined opposed edging clips having inwardly directed coplanar marginal portions frictionally interfitting between the pan flanges and the outer channel walls of the edging clips, the channel bottom of each edging clip being inwardly offset to provide a rigid abutting portion of double thickness, and a lateral guide flange on the terminal edge of each of the edging strip coplanar marginal portions slidably engaging the terminal edge of its associated pan flange.

3. A panel unit comprising a pair of opposed pans each having a vitreous or porcelain coating on the exterior surface thereof, a flange formed on each pan along each side edge thereof with the flanges of both pans in coplanar opposed relation, an edging clip for each flange having one part permanently secured to the inside surface of each pan and another part of elongated channel formation normal to the plane of said first mentioned part receiving the associated pan flange in contacting relation with the inner channel wall, said first mentioned part of the edging clip constituting an interior reinforcing border along the edge portion of each pan, said channels of opposed edging clips having their bottoms abutting and together defining a longitudinal recess, the outer walls of opposed channels being coplanar, spaced welds in said longitudinal recess joining said opposed edging clips together at said channel bottoms and lying on the side thereof opposite said reinforcing border parts to maintain the opposed pans in fixed assembled relation, a filler body within the opposed pans adhesively secured thereto, a unitary edging strip superposed over said joined edging clips having inwardly directed coplanar marginal portions frictionally interfitting between the pan flanges and the outer channel walls of the edging clips, the channel bottom of each edging clip being formed flat and inclined whereby the channel bottoms of opposed edging clips defining said longitudinal recess will provide an elongated deep V-shaped gap for said spaced welds.

4. The method of fabricating a panel unit made up of two opposed sheet metal pans comprising the steps of first attaching to the inside edge portions of each pan an edging clip by spot welding the same to the pan from the inside thereof with the welding electrode contacting the metal of the edging clip so as not to mar the exterior surface of said pans, initially joining the sheet metal pans by a filler body adhesively secured to the inside surface of the pans which are arranged in opposed relation with corresponding edging clips disposed in abutting relation whereby to permit handling of the assembled pans as a unit, then securing the edging clips together to effect the final joining of the pans, and lastly concealing the edging clips by an ornametal edging strip connected to the edging clips by a sliding friction fit.

References Cited in the file of this patent

UNITED STATES PATENTS

| | | |
|---|---|---|
| 1,817,653 | Thaden | Aug. 4, 1931 |
| 2,240,483 | Anderson | May 6, 1941 |
| 2,240,487 | Benham | May 6, 1941 |
| 2,297,609 | Clark et al. | Sept. 29, 1942 |
| 2,756,893 | Barrere | July 31, 1956 |
| 2,796,959 | Toney | June 25, 1957 |
| 2,828,046 | Weinman | Mar. 25, 1958 |